(12) United States Patent
Toebes

(10) Patent No.: US 8,437,458 B2
(45) Date of Patent: May 7, 2013

(54) SPEED DIAL LINE CALL INDICATOR

(75) Inventor: John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 790 days.

(21) Appl. No.: 12/613,654

(22) Filed: Nov. 6, 2009

(65) Prior Publication Data

US 2011/0110510 A1 May 12, 2011

(51) Int. Cl.
 *H03M 11/00* (2006.01)
 *H04M 15/06* (2006.01)
 *H04L 12/16* (2006.01)
 *G06F 3/14* (2006.01)

(52) U.S. Cl.
 USPC ........ 379/142.06; 341/22; 345/173; 370/352; 379/93.17; 379/216.01; 379/354; 379/355.01; 379/356.01; 455/413; 455/418; 455/550.1; 455/555; 455/564; 713/168; 715/810; 715/856; 715/864

(58) Field of Classification Search .................. 345/173; 370/352; 379/93.17, 142.06, 216.01, 354, 379/355.01, 356.01; 455/550.1, 555, 564, 455/418, 413, 551; 713/168; 341/22; 715/810, 715/856, 864
See application file for complete search history.

(56) References Cited

U.S. PATENT DOCUMENTS

| | | | | |
|---|---|---|---|---|
| 5,675,630 A * | 10/1997 | Beatty | ........................... | 455/551 |
| 6,781,575 B1 * | 8/2004 | Hawkins et al. | ............... | 345/173 |
| 6,957,397 B1 * | 10/2005 | Hawkins et al. | ............... | 715/856 |
| 6,993,360 B2 * | 1/2006 | Plahte et al. | ................... | 455/555 |
| 7,106,851 B2 * | 9/2006 | Tang et al. | ............... | 379/355.01 |
| 7,190,975 B2 * | 3/2007 | Rho | .............................. | 455/564 |
| 7,502,609 B2 * | 3/2009 | Kayzar et al. | ................. | 455/418 |
| 7,688,967 B2 * | 3/2010 | Patel et al. | ............... | 379/356.01 |
| 7,710,293 B2 * | 5/2010 | Kallqvist | ........................ | 341/22 |
| 8,041,396 B2 * | 10/2011 | Deubler, Jr. | ................... | 455/564 |
| 8,064,886 B2 * | 11/2011 | Hawkins et al. | ............... | 455/413 |
| 8,140,123 B2 * | 3/2012 | Tsuei | ............................. | 455/564 |
| 8,261,207 B2 * | 9/2012 | Hawkins et al. | ............... | 715/810 |
| 8,321,814 B2 * | 11/2012 | Hawkins et al. | ............... | 715/864 |
| 2004/0224717 A1 * | 11/2004 | Hertzberg et al. | ......... | 455/550.1 |
| 2005/0216738 A1 * | 9/2005 | Kita et al. | ..................... | 713/168 |
| 2006/0165056 A1 * | 7/2006 | Komaki | ........................ | 370/352 |
| 2007/0036137 A1 * | 2/2007 | Horner et al. | ................. | 370/352 |
| 2008/0107253 A1 * | 5/2008 | Gupta | ....................... | 379/216.01 |
| 2009/0170562 A1 * | 7/2009 | Kujala et al. | ................. | 455/564 |
| 2010/0322399 A1 * | 12/2010 | Couse et al. | ................ | 379/93.17 |
| 2010/0322409 A1 * | 12/2010 | Haitani et al. | ................ | 379/354 |
| 2011/0110510 A1 * | 5/2011 | Toebes | ..................... | 379/142.06 |

\* cited by examiner

*Primary Examiner* — Gerald Gauthier

(74) *Attorney, Agent, or Firm* — P. Su

(57) ABSTRACT

In one embodiment, a method includes obtaining information relating to a first telephone number, and determining whether the first telephone number corresponds to a first speed dial button on a device. The first speed dial button is highlighted if the first telephone number corresponds to the first speed dial button. If the first telephone number does not correspond to the first speed dial button, the method also includes determining whether the first telephone number is associated with a second telephone number, determining whether the second telephone number corresponds to the first speed dial button if the first telephone number is associated with the second telephone number, and highlighting the first speed dial button when it is determined that the second telephone number corresponds to the first speed dial button.

21 Claims, 10 Drawing Sheets

SPEED DIAL LINE CALL INDICATOR

BACKGROUND

The disclosure relates generally network communications, and more particularly to a user interface enhancements for telephonic communications Users of telephones often find it convenient to know who they are talking to on a telephone, regardless of whether they have placed a call or whether they have received a call. A user who initiates a call, e.g., a "caller," to a particular phone number may be able to identify the target of the call, e.g., a "callee," when the phone number appears on a display screen of a telephone. Similarly, a user who receives a call may be able to identify the originator of the call when the user subscribes to caller identification (ID) services which allow the phone number from which the call is received to appear on a display screen of a telephone.

When a telephone which includes a display screen that allows a caller to identify a callee, the caller may be provided with some measure of comfort, as the caller may be able to readily recall who he or she has called, and may be able o determine when a wrong phone number has been dialed. On the other hand, when a telephone that supports caller ID allows a callee to identify a caller, the callee may make an informed decision of whether or not to engage in a call with the callee.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1A:
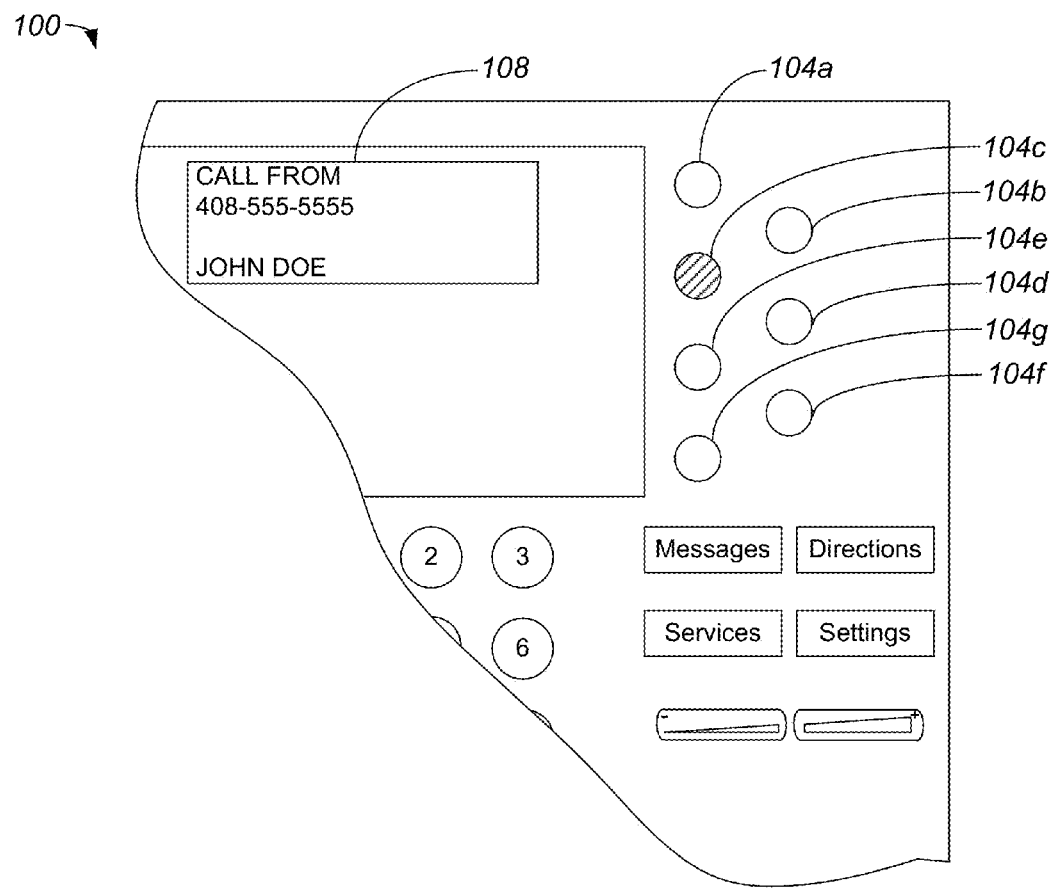
FIG. 1A is a diagrammatic representation of a portion of a telephone device that is arranged to highlight, e.g., illuminate, an appropriate speed dial button to identify a caller in accordance with an embodiment.

According to one aspect, a method includes obtaining information relating to a first telephone number, and determining whether the first telephone number corresponds to a first speed dial button on a device. The first speed dial button is highlighted if the first telephone number corresponds to the first speed dial button. If the first telephone number does not correspond to the first speed dial button, the method also includes determining whether the first telephone number is associated with a second telephone number, determining whether the second telephone number corresponds to the first speed dial button if the first telephone number is associated with the second telephone number, and highlighting the first speed dial button when it is determined that the second telephone number corresponds to the first speed dial button.

Description

Many telephones, including physical desk phones and representations of phones displayed on computer screens, include multiple speed dial buttons or keys to allow for quickly calling particular numbers. Often, speed dial buttons may be multi-functional, and may include features which allows the speed dial buttons to be highlighted. For example, a speed dial button may include an indicator light, or otherwise have an associated indicator light, that is arranged to be illuminated or otherwise lit when the speed dial button is selected.

An indicator light associated with a speed dial button may be highlighted to effectively indicate a status associated with a caller or a callee, as appropriate. In one embodiment, a speed dial button on a phone is configured to be highlighted, e.g., illuminated, when a call is received from the phone number effectively associated the speed dial button. For example, if a speed dial button is programmed with a home phone number and a call is received from the home phone number, the speed dial button may be highlighted. The speed dial button may further be configured to be highlighted when a call is received from a phone number with an association to the phone number programmed into the speed dial button. Hence, a callee or receiver of the call may readily identify that the call is from a party associated with the phone number tied to the speed dial button, even if the party initiated the call from a different phone number than the phone number associated with the speed dial button. For example, if a call recipient has a speed dial button programmed with a home phone number of an individual, the speed dial button may be highlighted when the individual calls, regardless of whether the individual calls from the home phone number or another phone number associated with the individual. In other words, when a call is received from an alternate phone number for an individual associated with a speed dial button, the speed dial button may be highlighted.

A speed dial button of a phone may also be highlighted when a caller uses the phone to place a call to the phone number associated with the speed dial button. A phone number that is associated with the speed dial button may generally be the phone number that is programmed into, or otherwise assigned to, the speed dial button. A speed dial button may be highlighted for the duration of a call when a speed dial number is dialed whether the speed dial number is dialed by pressing the speed dial button or is manually dialed. Manually dialing a speed dial number may include, but is not limited to including pressing numerical keys to dial the speed dial number, selecting the speed dial number from a directory, invoking the speed dial number via a redial function, or selecting the speed dial number via a click-to-dial application on a computer associated with the phone. It should be appreciated that the phone number associated with the speed dial button may be substantially owned by, or assigned to, an individual who also has substantially own other phone numbers. By way of example, a speed dial button may be associated with a home phone number of an individual who also has a cellular phone number. In one embodiment, when a caller has a speed dial button programmed for one phone number assigned to an individual and then calls the individual at a different phone number assigned to the individual, the speed dial button may be highlighted for the duration of the call. That is, when an alternate phone number for an individual associated with a speed dial button is called, the speed dial button may be highlighted.

In order to facilitate the processing of voice mails left on a phone, if a voice mail has been left by an individual associated with a speed dial button on the phone, the speed dial button may be highlighted along with a voice mail button to indicate that a voice mail has been left by the individual associated with the speed dial button. Thus, a recipient of the voice mail may readily identify the source of the voice mail without having to listen to the voice mail.

Referring initially to FIG. 1A, a telephone device or system that is arranged to highlight an appropriate speed dial button to identify a caller will be described in accordance with an embodiment. A telephone device 100, which may be a physical telephone or a software-implemented telephone with a graphical user interface displayed on a display screen, includes speed dial buttons 104a-f. Speed dial buttons 104a-f are arranged to be activated to cause associated phone numbers, or speed dial numbers, to be dialed. As will be appreciated by those skilled in the art, speed dial buttons 104a-f may generally be programmable such that a user of telephone device 100 may effectively assign phone numbers, i.e., speed dial numbers, to be associated with speed dial buttons 104a-f. Assigning a phone number to a speed dial button such as speed dial button 104a essentially assigns a party, or parties, to speed dial button 104a, as many phone numbers are associated with a particular party, or parties. In many instances, assigning a phone number to a speed dial button such as speed dial button 104a may also essentially assign a location to speed dial button 104a, as a user may program a phone number for a location, e.g., a main phone number for a school, into speed dial button 104a.

Telephone device 100 also includes a display 108 which, as shown, is arranged to indicate a source of a received call. Typically, the source of a received call may be indicated with a phone number and/or a name of a caller. It should be appreciated, however, that the source of a received call is not limited to be indicated with a phone number and/or a name of a caller. For example, the source of a call may be indicated by a location from which the call is received.

In the described embodiment, when a call is received on telephone device 100 from a caller that is associated with speed dial button 104c, speed dial button 104c may be highlighted. The caller may be calling from the phone number that is programmed into speed dial button 104c, or the caller may be calling from an alternate phone number that is effectively known to be associated with the caller. By way of example, speed dial button 104c may be programmed with the home phone number of the caller, and the caller may be calling from his cell phone. Because information that associates the caller with both the home phone number and his or her cell phone number is available to telephone device 100, speed dial button 104c may be highlighted as long as the caller is calling from a phone number that is effectively known to be associated with the caller. Thus, a user of telephone device 100 may be able to identify the source of a received call by noting that speed dial button 104c is highlighted.

It should be appreciated that in order to associate a phone number with a caller, some processing, e.g., translation, may need to be performed. For example, if a speed dial number is dialed from within an enterprise that requires dialing a '9' in order to call an external number, processing may be performed to effectively determine that the '9' dialed is not part of the speed dial number. Further, translation may allow a phone number that includes an area code, e.g., 408-555-5555, to be substantially matched to a speed dial number that is programmed into a speed dial button within an area code, e.g., 555-5555.

In addition to being configured to highlight, e.g., to illuminate, speed dial buttons 104a-f when a call is received from a party that is associated with a speed dial button 104a-f, telephone device 100 may also be configured to highlight speed dial buttons 104a-f when telephone device 100 is used to place a call to a party that is associated with a speed dial button 104a-f. That is, when a call is placed to a callee using telephone device 100, the appropriate speed dial button 104a-f which corresponds to the callee may be highlighted.

Figure 1B:
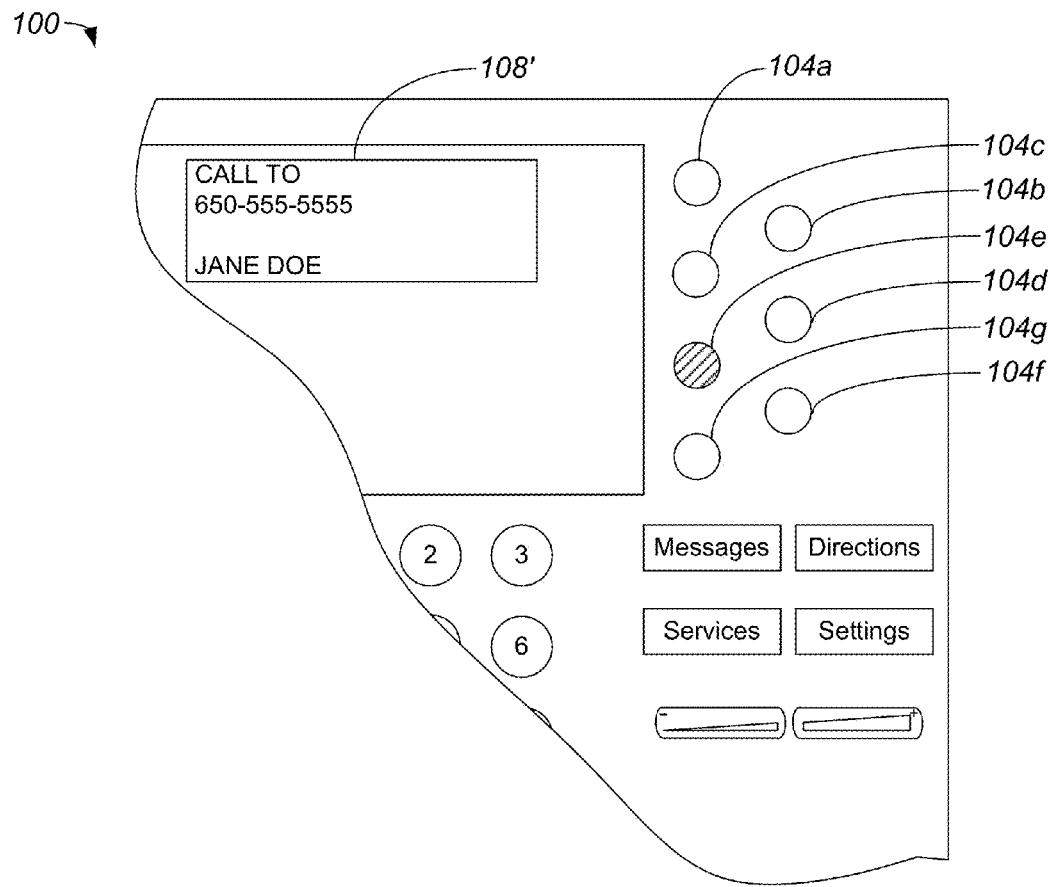
FIG. 1B is a diagrammatic representation of a portion of a telephone device, e.g., telephone device 100 of FIG. 1A, that is arranged to highlight an appropriate speed dial button to identify a callee in accordance with an embodiment.

As shown in FIG. 1B, when telephone device 100 is used to place a call to a callee that is associated with speed dial button 104e, speed dial button 104e is highlighted. In general, speed dial button 104e remains highlighted for the duration of a call between a user of telephone device 100 and the callee. Speed dial button 104e may be highlighted when the phone number programmed into, or otherwise assigned to, speed dial button 104e is called, as well as when a related phone number is called. Such a related phone number may be an alternate phone number effectively owned by a party that also effectively owns the phone number programmed into speed dial button 104e.

Figure 2:
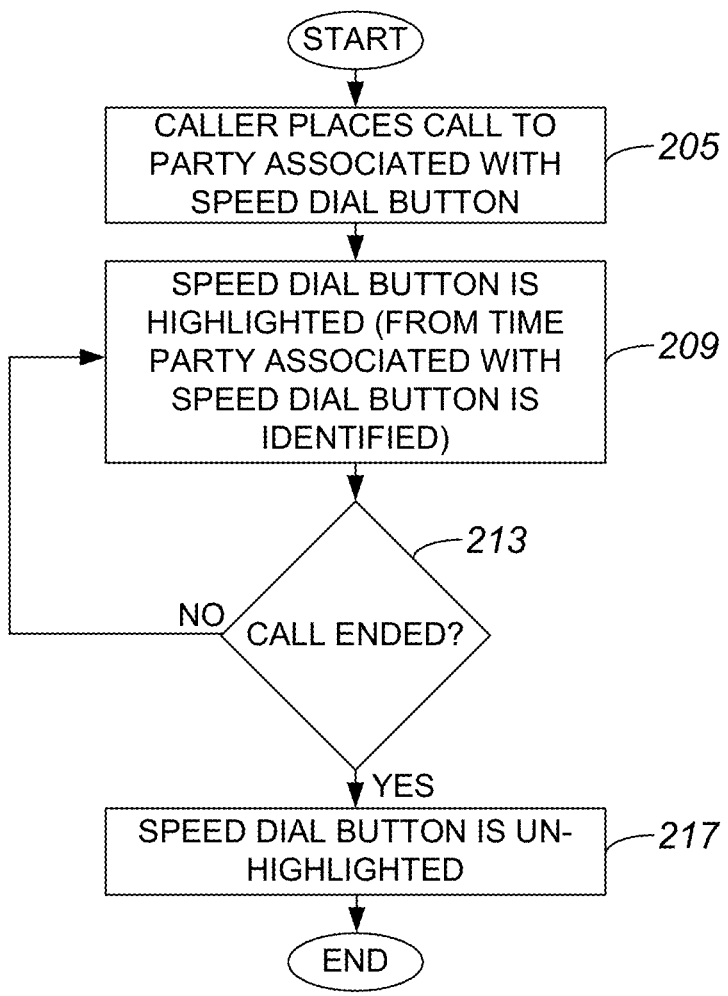
FIG. 2 is a process flow diagram which illustrates a method of highlighting a speed dial button when a call is placed to a party associated with the speed dial button in accordance with an embodiment.

FIG. 2 is a process flow diagram which illustrates a method of highlighting a speed dial button when a call is placed to a party associated with the speed dial button in accordance with an embodiment. A process 201 of highlighting a speed dial button when a call is placed begins at step 205 in which a caller places a call to a party associated with a speed dial button of a telephone device. The caller may typically place a call to the party by selecting the speed dial button associated with the party or by manually dialing a phone number associated with the party. It should be appreciated that other methods may also be used by the caller to place a call to the party, e.g., the caller may place a call to the party by selecting a "redial" option in the event that the caller has recently placed a call to the party, or selection of the phone number through a directory of recent calls, clicking on a phone number on a web page displayed on the phone, looking up the phone number in a directory, or selecting the phone number via an application on a computer which directs the phone to make a call via an API such as JTAPI. As will be discussed below with reference to FIG. 4, the telephone device or a call manager system associated with the telephone device is arranged to identify the number dialed by the caller as being associated with the speed dial button, e.g., as being associated with the party that is effectively associated with the speed dial button.

After the caller places a call to a party associated with a speed dial button, the speed dial button is highlighted in step 209. In general, the speed dial button is highlighted substantially from the time the party associated with the speed dial button is identified. In step 213, a determination is made as to whether the call has ended. The call may end when the caller hangs up, when the party called hangs up, and/or when the call is dropped by a service provider.

If it is determined in step 213 that the call has not ended, the speed dial button continues to be highlighted in step 209. Alternatively, if it is determined in step 213 that the call has ended, the speed dial button is "un-highlighted" in step 217. Once the speed dial button is no longer highlighted, the process of highlighting a speed dial button is completed.

Figure 3:
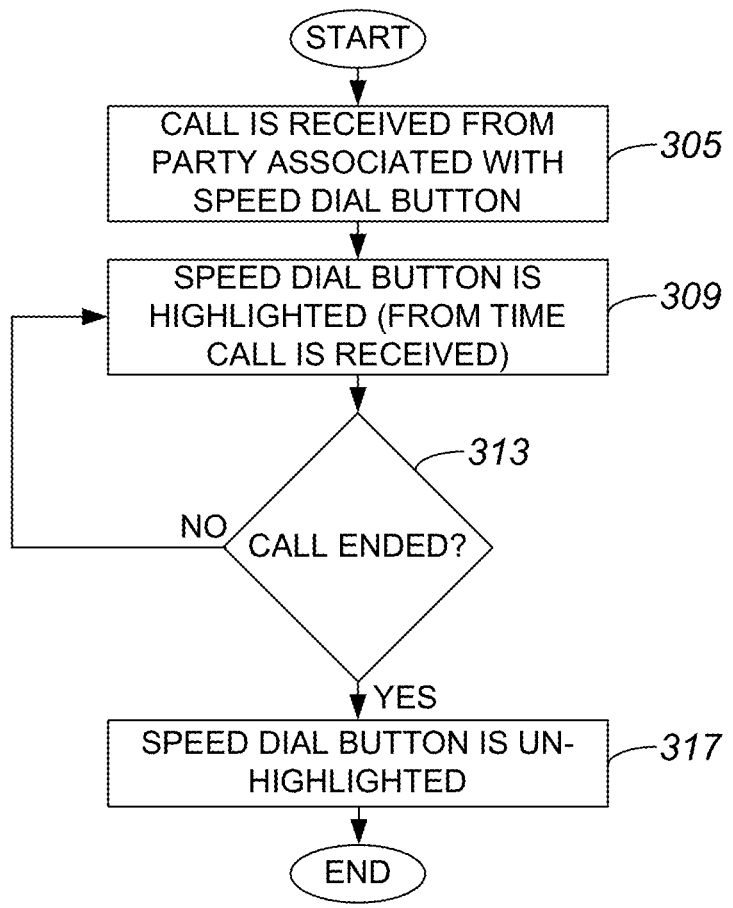
FIG. 3 is a process flow diagram which illustrates a method of highlighting a speed dial button when a call is received from a party associated with the speed dial button in accordance with an embodiment.

With reference to FIG. 3, a process flow diagram which illustrates a method of highlighting a speed dial button when a call is received from a party associated with the speed dial button will be described in accordance with an embodiment. A process 301 of highlighting a speed dial button begins at step 305 in which a call is received from a party that is associated with a speed dial button, i.e., a speed dial button on a telephone device used by a call recipient. The call may either be received form a phone number programmed into the speed dial button, or from an alternate phone number that is associated with the speed dial button, e.g., an alternate phone number owned by a party that also owns the phone number programmed into the speed dial button. The telephone device and/or a call manager associated with the telephone device may be arranged to determine that a call is from a party associated with the speed dial button. One method of identifying a call as being from a party associated with a speed dial button will be discussed below with respect to FIG. 5.

In step 309, the speed dial button is highlighted. Generally, the speed dial button may be highlighted substantially from the time the call is received. The call may be identified as being received at the time a party associated with the speed dial button is identified. In one embodiment, step 305 and step 309 may occur substantially simultaneously. After the speed dial button is highlighted, it is determined in step 313 whether the received call has ended. If it is determined that the call has not ended, process flow returns to step 309 in which the speed dial button continues to be highlighted. Alternatively, if it is determined in step 313 that the call has ended, the speed dial button is un-lighted in step 317, and the process of highlighting a speed dial button is completed.

As previously mentioned, a telephone device and/or a call manager may be configured to determine whether a particular call is associated with a speed dial button. That is, a telephone device and/or a call manager may determine whether a phone number that has been called, or a phone number that a call is received from, is either a phone number programmed into a speed dial button or a phone number that is otherwise associated with a speed dial button, e.g., associated with an owner of the phone number programmed into a speed dial button.

Figure 4:
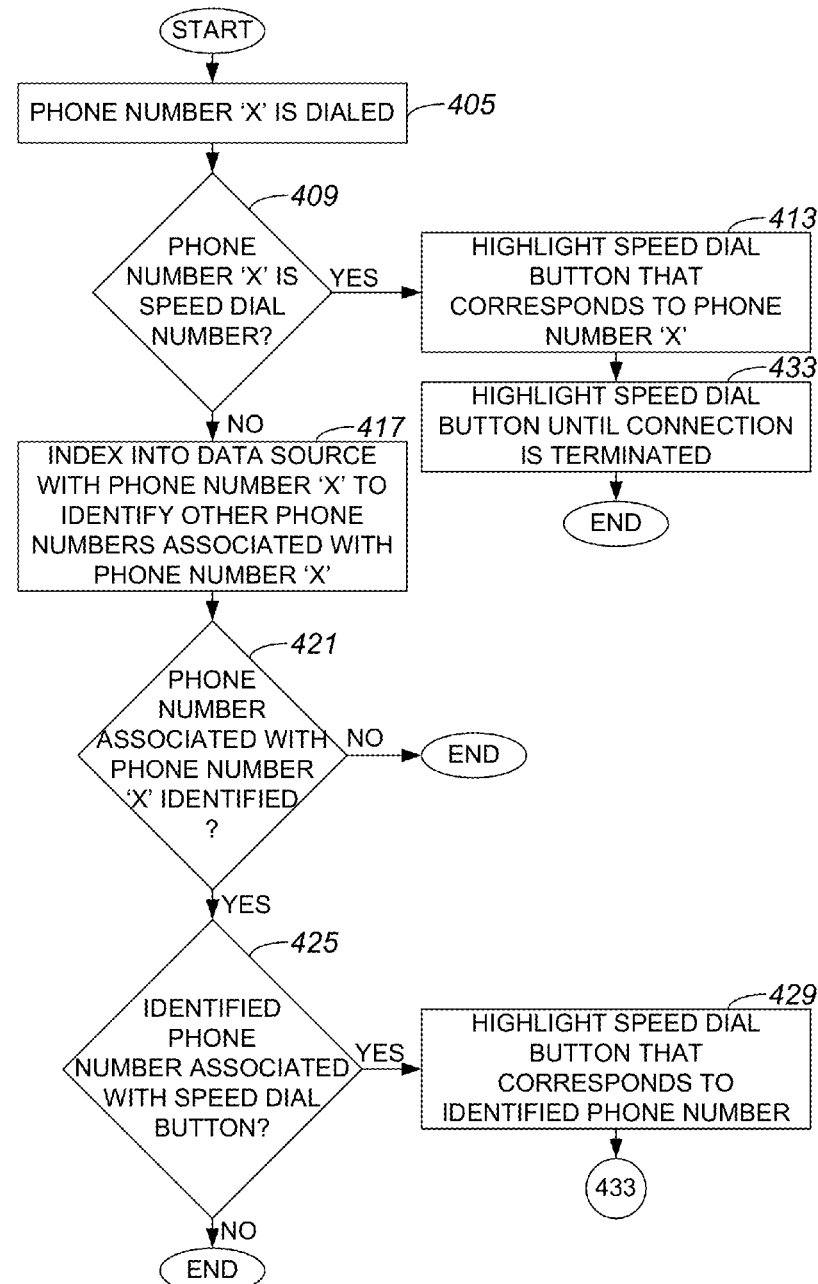
FIG. 4 is a process flow diagram which illustrates a method of identifying a callee as being associated with a speed dial button in accordance with an embodiment.

FIG. 4 is a process flow diagram which illustrates a method of identifying a party being called, e.g., a callee, as being associated with a speed dial button in accordance with an embodiment. A method 401 of identifying a callee as being associated with a speed dial button begins at step 405 in which a phone number, e.g., phone number 'X', is dialed. Typically, dialing phone number 'X' initiates a connection to phone number 'X'. In the described embodiment, a caller places a call to a callee by dialing phone number 'X'.

A determination is made in step 409 as to whether phone number 'X' is a speed dial number, or is associated with a speed dial button. Such a determination may include determining whether phone number 'X' was dialed by engaging a speed dial button. In general, such a determination may include cannonicalizing the dialed phone number such that dialing an area code with a phone number, e.g., 919-555-5555, is substantially equated to dialing the phone number without the area code, e.g., 555-5555.

If it is determined in step 409 that phone number 'X' is a speed dial number, the speed dial button that corresponds to phone number 'X' is highlighted, e.g., illuminated or lit up, in step 413. The speed dial button then remains highlighted in step 433 until the connection between the caller and the callee is terminated. The process of identifying a callee as being associated with a speed dial button is completed once the speed dial button is highlighted Returning to step 409, if it is determined that phone number 'X' is not a speed dial number, then process flow moves to step 417 in which phone number 'X' is used to index into a data source to identify any other phone numbers associated with phone number 'X'. That is, it is effectively determined whether a party associated with phone number 'X' is associated with any alternate phone numbers. Typically, indexing into a data source may be performed by a call manager or by a telephone device, and may involve first identifying a party associated with phone number 'X', then identifying alternate phone numbers associated with the party. A data source may be any searchable data structure including, but not limited to including, a database.

Once the data source is indexed into with phone number 'X', it is determined in step 421 whether an alternate phone number associated with phone number 'X' has been identified. That is, it is determined whether the party associated with phone number 'X' is associated with any other known alternate phone number. If it is determined that there is no alternate phone number associated with phone number 'X', then the indication is that no speed dial button is to be highlighted. Accordingly, the process of identifying a callee as being associated with a speed dial button is completed.

Alternatively, if it is determined in step 421 that an alternate phone number associated with phone number 'X' has been identified, then process flow moves to step 425 and a determination as to whether an identified alternate phone number is associated with a speed dial button. That is, it is determined in step 425 whether the identified alternate phone number is a speed dial number.

If the determination in step 425 is that the identified phone number is not associated with a speed dial button, a connection between a caller and a callee is allowed to continue until the connection is terminated, and the process of identifying a callee as being associated with a speed dial button is completed. On the other hand, if the determination in step 425 is that the identified phone number is associated with a speed dial button, the speed dial button that corresponds to the identified phone number is highlighted in step 429. Then, process flow moves to step 433 in which the speed dial button remains highlighted until the connection between the caller and the callee is terminated.

Figure 5:
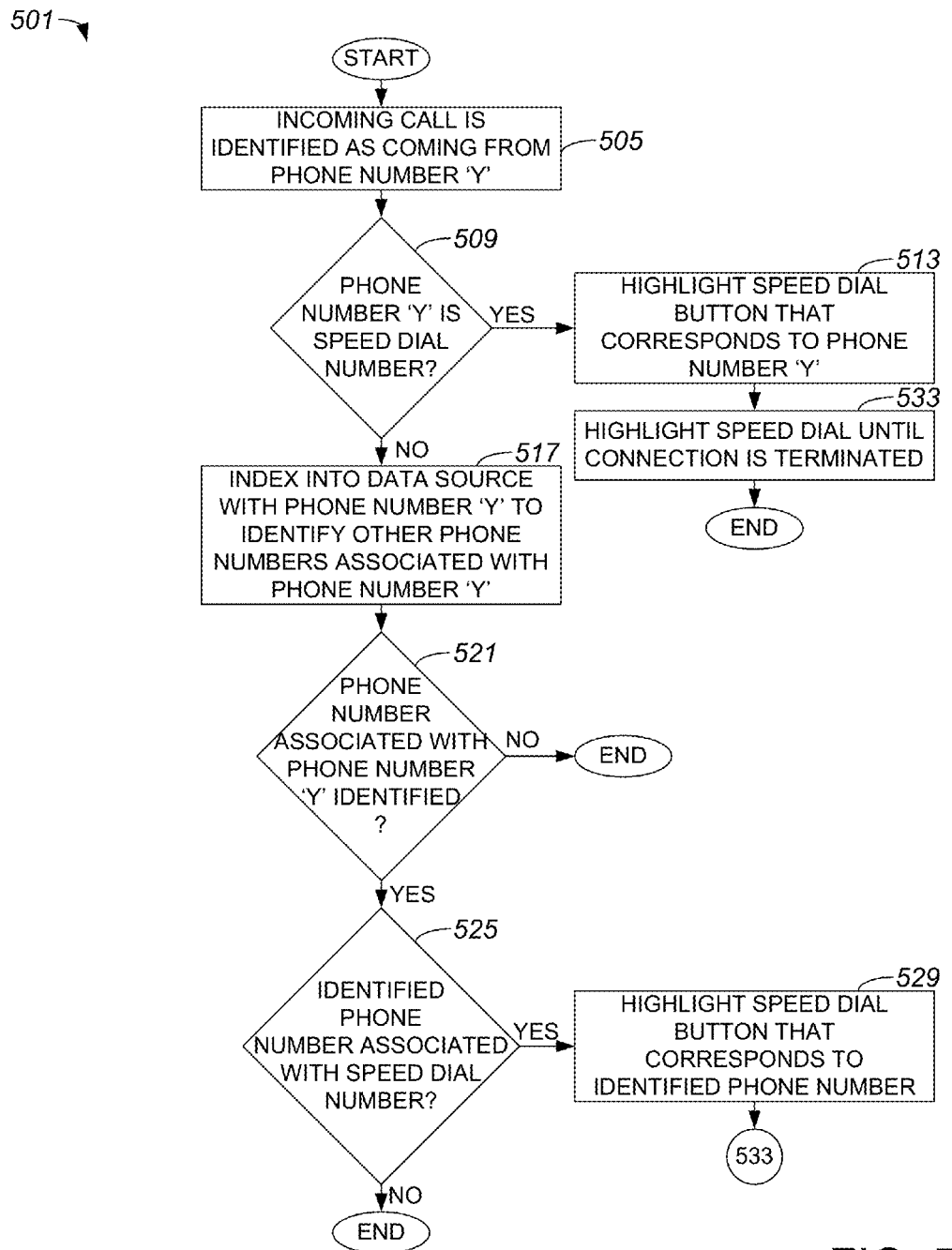
FIG. 5 is a process flow diagram which illustrates a method of identifying an incoming call as being from a caller associated with a speed dial button in accordance with an embodiment.

Referring next to FIG. 5, a method of identifying an incoming call as being from a caller associated with a speed dial button will be described in accordance with an embodiment. A process 501 of identifying an incoming call as being from a caller associated with speed dial button begins at step 505 in which an incoming call, or a call received from a caller, is identified as coming from phone number 'Y'. An incoming call may be identified to a callee as coming from phone number 'Y' at substantially any time after a connection is initiated by the caller with the callee. Any suitable method may generally be used to substantially identify the source of the incoming call. For example, a packet of information transmitted by a telephone device of the caller to a telephone device of the callee may be parsed to locate information which identifies phone number 'Y' as the source of an incoming call such as is delivered via a SIP Invite or as part of a Caller ID signal. The telephone may also communicate back to a call manager to query information about the call origin as a part of a call setup process.

After the incoming call is identified as coming from phone number 'Y', a determination is made in step 509 as to whether phone number 'Y' is a speed dial number, i.e., a speed dial number programmed with respect to the telephone device of the callee. If it is determined in step 509 that phone number 'Y' is a speed dial number and, thus, is associated with a speed dial button, the speed dial button is highlighted in step 513. That is, the speed dial button that corresponds to phone number 'Y' is highlighted. Once the speed dial button is highlighted, the speed dial button remains highlighted in step 533 until the connection between the caller and the callee is terminated, and the process of identifying an incoming call as being from a caller associated with speed dial button is completed.

Alternatively, if the determination in step 509 is that phone number 'Y' is not a speed dial number, process flow moves to step 517 in which phone number 'Y' is used to index into a data source to identify any other phone numbers associated with phone number 'Y'. In other words, a determination is effectively made as to whether a party associated with phone number 'Y' is also associated with at least one alternate phone number. Indexing into a data source may be performed by a call manager or by a telephone device, and may involve first identifying the caller associated with phone number 'Y', then identifying alternate phone numbers associated with the caller. This data source may include, but is not limited to including, corporate directories such as LDAP or web based directories, corporate e-mail directories such as Microsoft Exchange, personal telephone directories stored on a computer associated with a callee, network based directories such as Yahoo People, and general search engines such as Google or Bing.

Once the data source is indexed into in step 517 with phone number 'Y', a determination is made in step 521 as to whether an alternate phone number associated with phone number 'Y' has been identified. If it is determined that no alternate phone number associated with phone number 'Y' has been identified, the implication is that no speed dial button is to be highlighted, and the process of identifying a caller as being associated with a speed dial button is completed.

Alternatively, if it is determined in step 521 that an alternate phone number associated with phone number 'Y' has been identified, then process flow moves to step 525 in which it is determined whether the identified alternate phone number is associated with a speed dial button. In other words, it is determined in step 525 whether the identified alternate phone number is a speed dial number.

If it is determined in step 525 that the identified phone number is not associated with a speed dial button, a connection between a caller and a callee is allowed to continue until the connection is terminated, and the process of identifying a caller as being associated with a speed dial button is completed. Alternatively, if the determination in step 525 is that the identified phone number is associated with a speed dial button, the speed dial button that corresponds to the identified phone number is highlighted in step 529. Then, process flow moves to step 533 in which the speed dial button remains highlighted until the connection between the caller and the callee is terminated.

In one embodiment, an appropriate speed dial button may be highlighted when a voice mail message is effectively left at a phone number associated with a telephone device. By way of example, if telephone device has a speed dial button programmed with a phone number associated with a party, that speed dial button may be illuminated when a voice mail message is left by the party. Thus, when a speed dial button is highlighted and the existence of a voice mail message is indicated, e.g., on display screen of a telephone device, a user of the telephone device may readily identify the source of a voice mail message.

Figure 6:
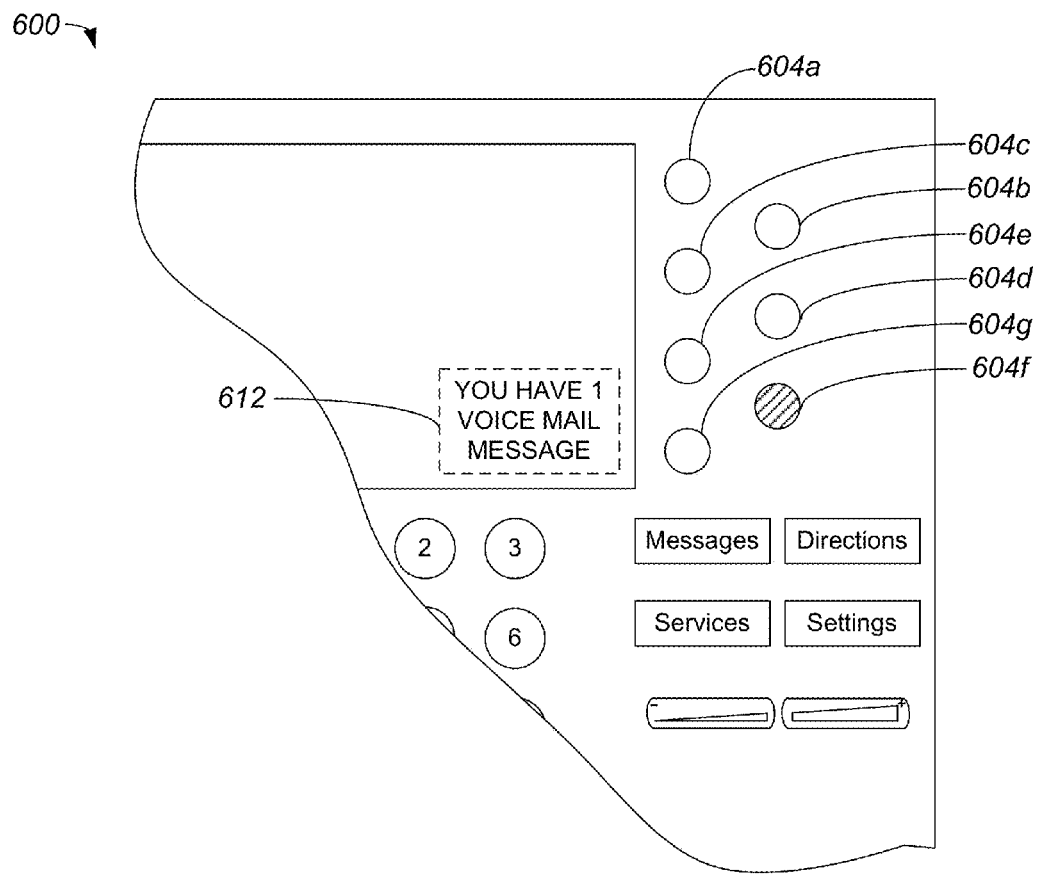
FIG. 6 is a diagrammatic representation of a portion of a telephone device that is arranged to highlight, e.g., illuminate, an appropriate speed dial button to identify a source of a voice mail message in accordance with an embodiment.

FIG. 6 is a diagrammatic representation of a portion of a telephone device that is arranged to highlight, e.g., illuminate, an appropriate speed dial button to identify a source of a voice mail message in accordance with an embodiment. A telephone device 600 includes speed dial buttons 604a-f that are arranged to be activated, e.g., pressed, to cause speed dial numbers associated with speed dial buttons 604a-f to be dialed. A display 612 is arranged to indicate the existence of a voice mail message. In the embodiment as shown, when a voice mail message is left by a party associated with speed dial button 604f, speed dial button 604f may be highlighted and display 612 may indicate that a voice mail message has been left.

Figure 7:
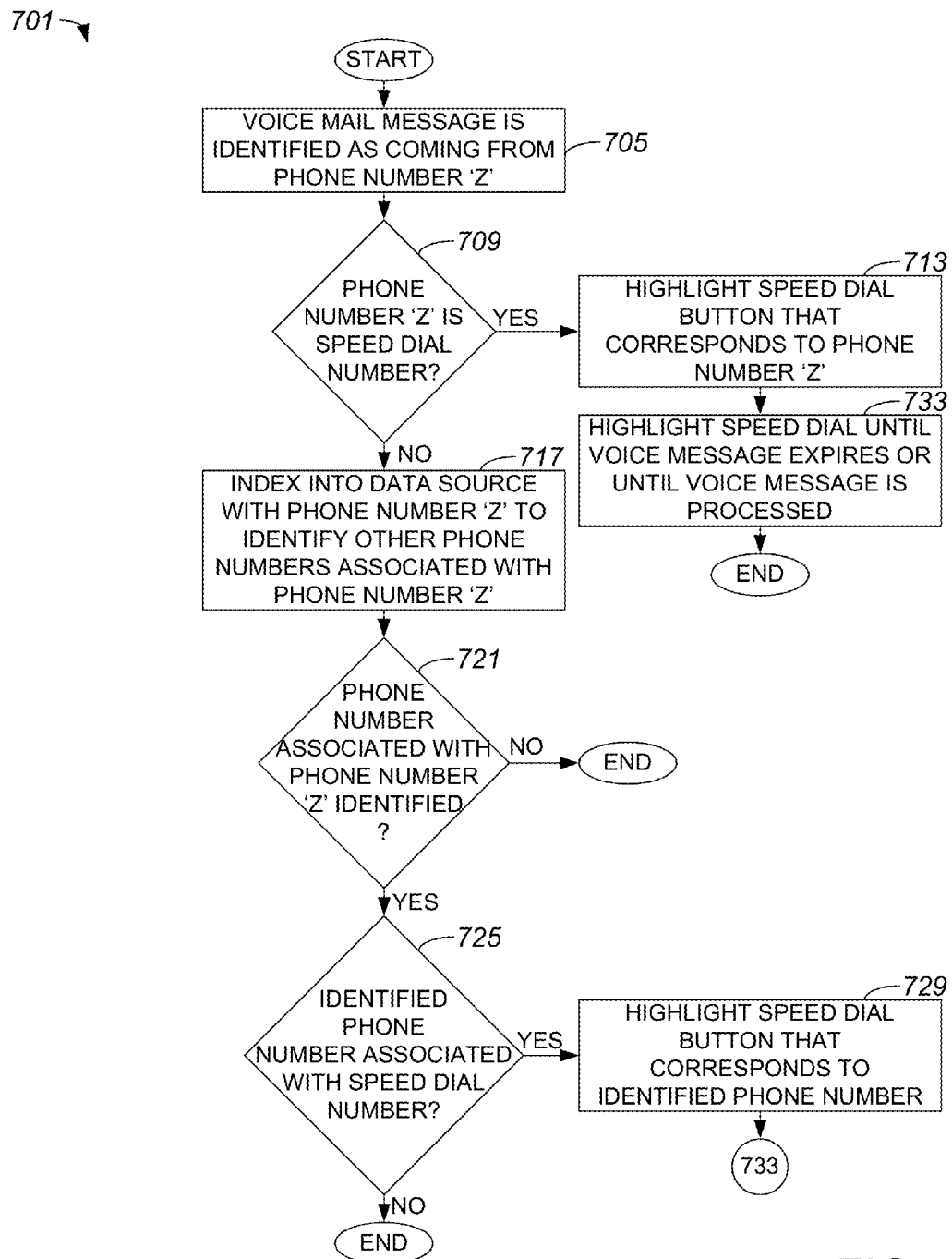
FIG. 7 is a process flow diagram which illustrates a method of identifying a voice mail message as being from a caller associated with a speed dial button in accordance with an embodiment.

In general, when a voice mail message is recorded, a source of the voice mail message may be identified as being associated with a speed dial button. With reference to FIG. 7, a method of identifying a voice mail message as being from a caller associated with a speed dial button will be described in accordance with an embodiment. A method 701 of identifying a voice mail message as being from a caller associated with a speed dial button begins at step 705 in which a voice mail message, e.g., a voice mail message left on a telephone device of a callee, is identified as coming from phone number 'Z'. Such an identification may generally be made using any suitable method including, but not limited to including, a voice mail server notifying the telephone what voice mails are available, the telephone querying the voice mail server and parsing the results, and a call manager performing the operations on the behalf of the telephone.

A determination is made in step 709 as to whether phone number 'Z' is a speed dial number, or is associated with a speed dial button. If it is determined that phone number 'Z' is a speed dial number, the speed dial button that corresponds to phone number 'Z' is highlighted, e.g., illuminated or lit up, in step 713. The speed dial button then remains highlighted in step 733 until the voice mail message expires or is processed, e.g., accessed by the callee. The process of identifying a voice mail message as being from a caller associated with a speed dial button is completed once the speed dial button is highlighted.

Returning to step 709, if it is determined that phone number 'Z' is not a speed dial number, then process flow moves to step 717 in which phone number 'Z' is used to index into a data source to identify alternate phone numbers that may be associated with phone number 'Z'. Indexing into a data source may be performed by a call manager or by a telephone device, and may involve first identifying a party associated with phone number 'Z', then identifying alternate phone numbers associated with the party.

After the data source is indexed into with phone number 'Z', it is determined in step 721 whether an alternate phone number associated with phone number 'Z' has been identified. In other words, it is determined whether the party associated with phone number 'Z' is associated with any other known alternate phone number. If it is determined that there is no alternate phone number associated with phone number 'Z', then the indication is that no speed dial button is to be highlighted. As such, the process of identifying a voice mail message as being from a caller associated with a speed dial button is completed.

Alternatively, if it is determined in step 721 that an alternate phone number associated with phone number 'Z' has been identified, then process flow moves to step 725 and a determination as to whether an identified alternate phone number is associated with a speed dial number and, hence, a speed dial button. If the determination is that the identified phone number is not associated with a speed dial button, the process of identifying a voice mail message as being from a caller associated with a speed dial button. On the other hand, if the determination in step 725 is that the identified phone number is associated with a speed dial button, the speed dial button that corresponds to the identified phone number is highlighted in step 729. Then, process flow moves to step 433 in which the speed dial button remains highlighted until the voice mail message either expires or is processed.

Figure 8:
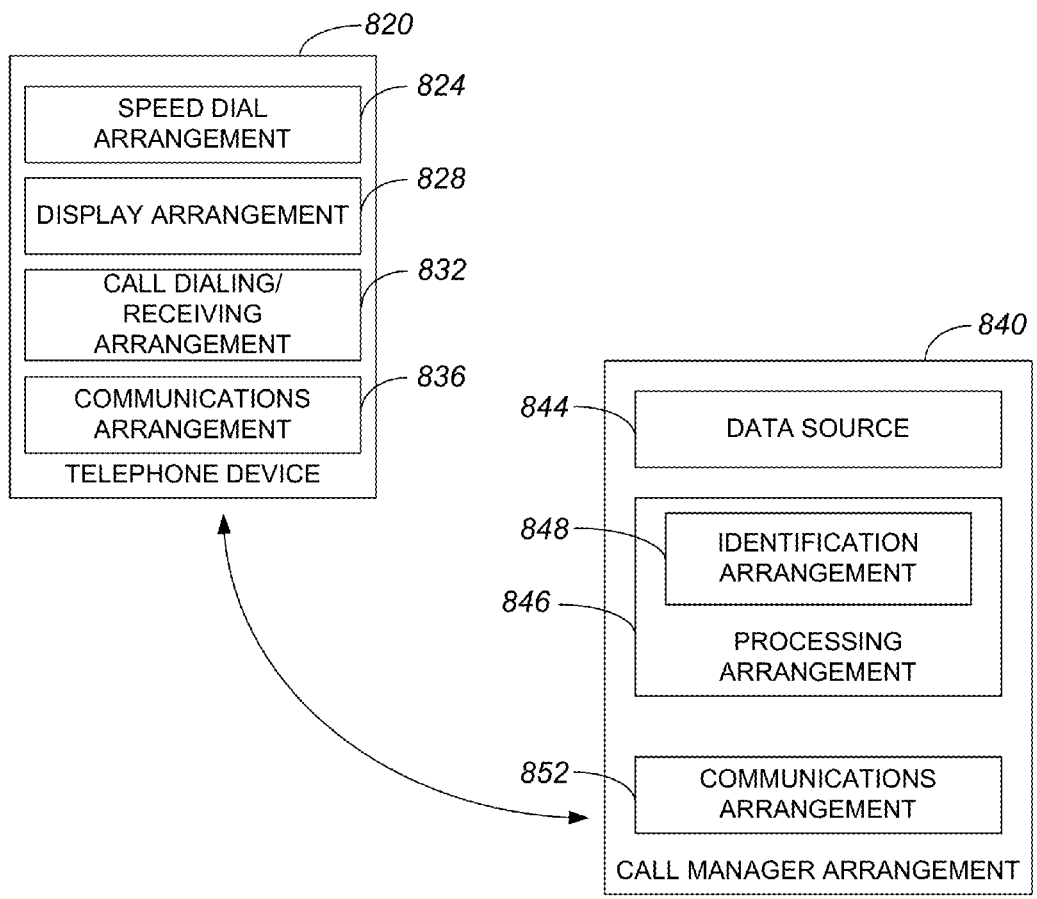
FIG. 8 is a block diagram representation of a system that includes a call manager which is arranged to cooperate with a phone device to highlight speed dial buttons on the phone device in accordance with an embodiment.

In general, the functionality which enables a speed dial button to be highlighted to identify a caller, a callee, or a source or a voice mail message may be provided such that a telephone device cooperates with a call manager to highlight a speed dial button. Alternatively, such functionality may be provided such that the telephone device may highlight a speed dial button substantially without cooperating with a call manager. FIG. 8 is a block diagram representation of an overall system that includes a call manager which is arranged to cooperate with a phone device to highlight speed dial buttons on the phone device in accordance with an embodiment. An overall system, e.g., a telephone network or a telecommunications system, includes at least one telephone device 820 and a call manager arrangement 840.

Telephone device 820 may be a physical telephone, e.g., a desktop telephone, or a software-implemented phone which includes a graphical user interface that is displayed on a display screen. Telephone device 820 includes a speed dial arrangement 824 which generally includes logic configured to enable speed dial numbers to be programmed or otherwise set, as well as logic that allows speed dial buttons to be highlighted. In one embodiment, speed dial arrangement 824 includes hardware components such as physical speed dial buttons which may be pressed to cause speed dial numbers to be dialed and light source arrangements which allow speed dial buttons to be highlighted.

A display arrangement 828 of telephone device 820 is arranged to display information to a user. The information displayed to a user may include, but is not limited to including, caller ID information, information relating to a number that is dialed, and information relating to whether a voice mail message is awaiting the user. Telephone device 820 also generally includes a call dialing and receiving arrangement 832. Call dialing and receiving arrangement 832 is generally includes logic that allows telephone device 820 to dial phone numbers to initiate telephone calls, and also includes logic that allows telephone device 820 to receive telephone calls.

A communications arrangement 836 of telephone device is generally configured to allow telephone device 820 to communicate with call manager arrangement 840, as well as with other devices (not shown). Devices with which telephone device 820 may communicate include, but are not limited to including, other telephone devices, computing devices, media players, and/or any suitable networked device such as a voice mail server on which voice mail messages may be stored. Communications arrangement 836 may be arranged to enable telephone device 820 to communicate over physical connections, e.g., transmission cables, and/or wireless connections. In one embodiment, telephone device 820 may be a voice over Internet Protocol (VoIP) device, and communications arrangement 836 may be configured to support VoIP communications.

Speed dial arrangement 824 may cause speed dial buttons to be highlighted in response to information received from call manager arrangement 840. By way of example, when call manager arrangement 840 determines that a phone number dialed using telephone device 820 is associated with a speed dial button, call manager arrangement may either substantially directly cause the speed dial button to be highlighted, or call manager arrangement 840 may provide information to telephone device 820 that causes telephone device 820 to highlight the speed dial button.

Figure 9:
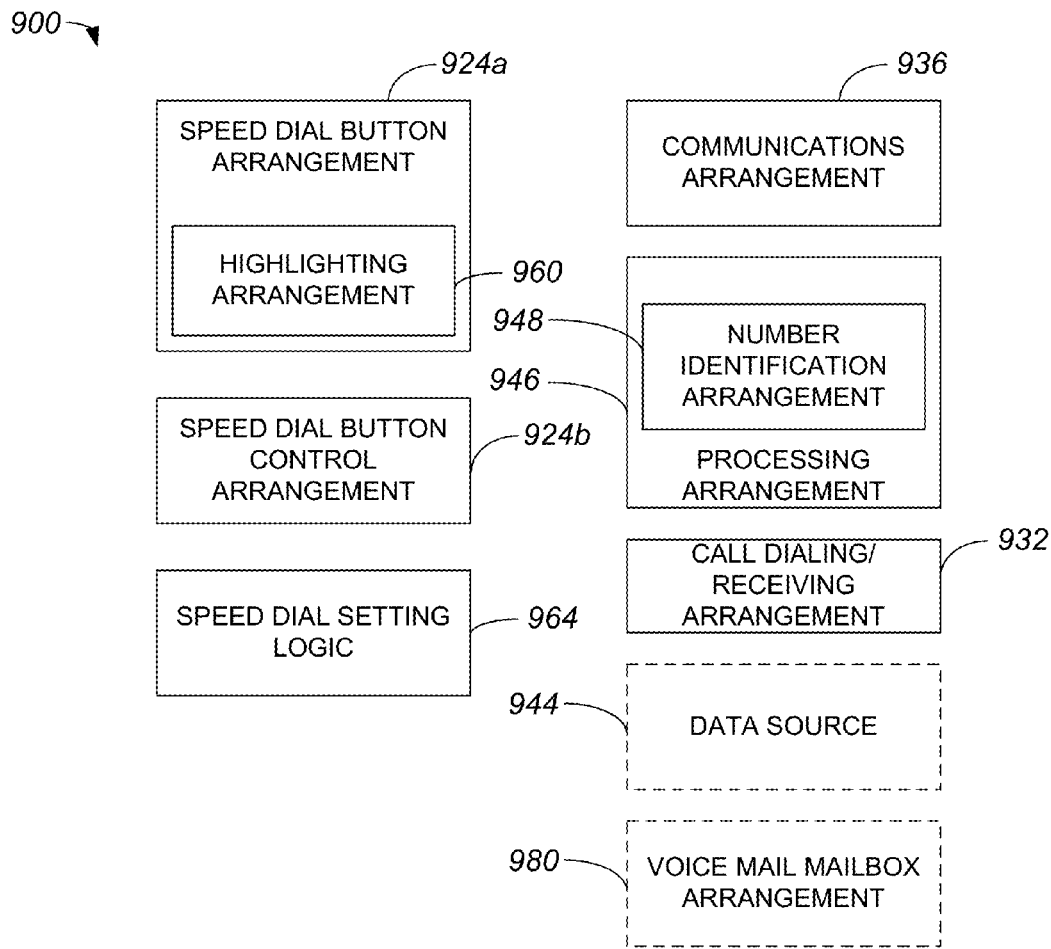
FIG. 9 is a block diagram representation of a telephone device system which is arranged to highlight speed dial buttons in accordance with an embodiment.

Call manager arrangement 840 includes a communications arrangement 852 that allows call manager arrangement 840 to exchange information with telephone device 820. Communications arrangement 852 is generally also configured to facilitate communications between telephone device 820 and other devices (not shown). Call manager arrangement 840 also includes a processing arrangement 846 which processes information obtained using communications arrangement 852. As shown, processing arrangement 846 includes an identification arrangement 848 which is configured to identify a phone number from which a telephone call is initiated, a phone number to which a telephone call is placed, any alternate phone number associated with a phone number from which a telephone call is initiated, and any alternate phone number associated with a phone number to which a telephone call is placed. In one embodiment, identification arrangement 848 may access a data source 844 to access information relating to phone numbers, e.g., to identify a set of phone numbers associated with a party or an entity. Data source 844 may generally be an indexable data structure which may be searched based on a phone number to identify related phone numbers and/or the identity of a party or parties associated with the phone number. As previously mentioned, data source 844 may include, but is not limited to including, corporate directories such as LDAP or web based directories, corporate e-mail directories such as Microsoft Exchange, personal telephone directories stored on a computer associated with a caller or callee, network based directories such as Yahoo People, and general search engines such as Google or Bing In lieu of having a telephone device cooperate with a call manager arrangement to highlight speed dial buttons, a telephone device may be configured to operate substantially without a call manager to highlight speed dial buttons. FIG. 9 is a block diagram representation of a telephone device which is arranged to highlight speed dial buttons in accordance with an embodiment. A telephone device 900 includes a speed dial button arrangement 924a and a speed dial button control arrangement 924b. Speed dial button arrangement 924a may include physical and/or software-implemented speed dial buttons that are arranged to be highlighted using a highlighting arrangement 960. Highlighting arrangement 960 may include light sources such as light emitting diodes (LEDs). In one embodiment, speed dial button control arrangement 924b may provide information to speed dial button arrangement 924a which indicates when speed dial button arrangement 924a is to highlight a particular speed dial button. Speed dial button setting logic 964 generally allows speed dial buttons to be programmed to be associated with particular phone numbers.

Telephone device 900 also includes a communications arrangement 936, a call dialing and receiving arrangement 932, a processing arrangement 946, and an optional data source 944. Communications arrangement 936 is configured to allow telephone device 900 to communicate, as for example over a communications network, with other networked devices. In general, communications arrangement 936 may allow information, e.g., information relating to a phone number, to be provided by and obtained by telephone device 900. Call dialing and receiving arrangement 932 is arranged to allow telephone device 900 to initiate calls, receive calls, and to otherwise participate in calls. Processing arrangement 946 processes information obtained using communications arrangement 952, and may include a number identification arrangement 948 which is configured to identify a phone number from which a telephone call is initiated, a phone number to which a telephone call is placed, any alternate phone number associated with a phone number from which a telephone call is initiated, and any alternate phone number associated with a phone number to which a telephone call is placed. Identification arrangement 948 may access a data source 944 to obtain information relating to phone numbers, e.g., to identify a set of phone numbers associated with a party or an entity. Data source 944 may generally be an indexable data structure which may be searched based on a phone number to identify related phone numbers and/or the identity of a party or parties associated with the phone number. Although data source 944 is shown as being a part of or local with respect to telephone device 900, it should be appreciated that data source 944 may instead to external or remote with respect to telephone device 900.

An optional voice mail mailbox arrangement 980, which is arranged to store and to manage voice mail messages, may also be included in telephone device 900. In one embodiment, telephone device 900 may not include voice mail mailbox arrangement 980 and may, instead, be arranged to access a remote voice mail mailbox through communications arrangement 936.

Although only a few embodiments have been described in this disclosure, it should be understood that the disclosure may be embodied in many other specific forms without departing from the spirit or the scope of the present disclosure. By way of example, identifying a source of a voice mail message has been described as occurring substantially while the voice mail message is being recorded. In general, the source of a voice mail message may be identified at substantially any time after the source establishes a connection, and is not limited to being identified while a voice mail message is being recorded.

While a speed dial number has been described as being associated with a speed dial button, a speed dial number is not limited to being associated with a speed dial button. In other words, a structure that is arranged to be highlighted to identify a caller or a callee is not limited to being a button and may, instead, be any suitable representation that may be highlighted. By way of example, for a software-implemented phone, a speed dial button may be represented as an area on a display screen, and highlighting such an area may generally include substantially anything that differentiates the area from other areas and/or substantially anything that brings attention to the area.

In one embodiment, a plurality of speed dial buttons may be highlighted on a telephone if a user of the telephone is participating on a multi-party conference call. For instance, if a user of a telephone is on a conference call with two parties associated with speed dial buttons of the telephone, the speed dial buttons associated with the two parties may both be highlighted to provide the user with an indication that he or she is on a call with the two parties.

As previously mentioned, highlighting a speed dial button may include illuminating a light source associated with the speed dial button. Illuminating the light source may generally include, but is not limited to including, causing the light source to flash, causing the light source to light up with a particular color, and causing the light source and another button such as a main line button to light up. It should be appreciated that if a speed dial button is displayed as part of a user interface on a display screen, e.g., a display screen of a computing device, highlighting the speed dial button may generally include changing the appearance of the speed dial button or otherwise emphasizing the speed dial button with respect to other speed dial buttons.

The manner in which a speed dial button is highlighted may vary depending upon whether the phone number that is called, or the phone number from which a call is received, is the phone number which is programmed for the speed dial button. For example, if a call is made to the phone number that is actually programmed for the speed dial button, the speed dial button may light up as one color, and if the call is made from a different phone number that is associated with an owner of the phone number that is actually programmed for the speed dial button, the speed dial button may light up as another color.

Where the presence status of parties associated with speed dial buttons is available, it should be appreciated that the presence status may be indicated on the speed dial buttons without departing from the spirit or the scope of the present disclosure. For instance, the type of highlighting used to highlight a speed dial button when a call is placed or received may vary depending upon the presence status of a party associated with the speed dial button.

When voice mail messages are left by different parties associated with speed dial buttons, more than one speed dial button may be highlighted at substantially the same time. In other words, when more than one voice mail message is left, e.g., on a telephone device or in a voice mail mailbox associated with a telephone device, speed dial buttons associated with each voice mail message may be highlighted as appropriate to indicate the sources of the voice mail messages.

In one embodiment, where a picture of a callee is displayed to a caller when the caller dials a phone number associated with the callee, the picture of the callee may remain displayed after the callee and the caller are connected on a call. Such a picture may be displayed in addition to highlighting a corresponding speed dial button, although such a picture is not limited to being displayed in addition to highlighting the corresponding speed dial button.

Two parties which are each associated with speed dial numbers may, in some instances, share an alternate phone number. For example, speed dial buttons may be programmed with cell phone numbers for parties that share the same alternate phone number, such as a corporate phone number. In a case where the same alternate number may be found to effectively match multiple speed dial buttons on a telephone, such as in the case where two people list a corporate main number as their alternate number, the telephone may be arranged to highlight multiple speed dial buttons, to highlight no speed dial buttons, or to choose an alternate mechanism of highlighting the speed dial buttons to indicate the ambiguity. One preferred mechanism of disambiguating in such a case may be to determine which of the two speed dial buttons the caller had made contact with most recently, either by calling or being called, and then choosing to highlight the speed dial button that corresponds to the caller with which contact has most recently been made. Alternate mechanisms for disambiguating may include, but are not limited to including, considering the frequency of contact with the parties, analysis of previous times call were made to the parties, and considering the positional placement of the speed dial buttons such that a first speed dial button is selected. Disambiguation may also take place when a call is connected by examining the phone number of a call-receiving, or answering, party which is returned by IP-based telephony protocols or via RDNIS and other similar protocols.

Highlighting of speed dial buttons may be performed in the context of call forwarding. For example, if a caller has a speed dial button that corresponds to a first party and another speed dial button that corresponds to the second party, when the first party has his telephone calls forwarded to the second party, any call made by the caller to the first party may then be forwarded to the second party, thereby causing the speed dial button that corresponds to the second party to be highlighted on the telephone device of the caller. It should be appreciated that until the call is forwarded, the speed dial button that corresponds to the first party would be highlighted on the telephone device of the caller.

The highlighting of speed dial buttons may be applicable with respect to group hunt numbers. For example, a group hunt number may be associated with multiple parties, where a caller has the phone numbers of each of the multiple parties assigned to speed dial numbers. When the caller dials the group hunt number, no speed dial button may be highlighted on the telephone device of the caller until one of the parties associated with the group hunt number answers his telephone. When a party associated with the group hunt number answers his telephone, the speed dial button on the telephone device of the caller that corresponds to the party would then be highlighted.

In one embodiment, if a caller on a call is transferred by an initial callee to a secondary callee, and the caller has a speed dial button on his telephone device that is associated with the secondary callee, the speed dial button associated with the secondary callee will be highlighted. It should be appreciated that if the caller also has a speed dial button on his telephone device that is associated with the initial callee, the speed dial button associated with the initial callee may be highlighted until such time as the call is transferred to the secondary callee.

When a telephone device supports call waiting functionality, when a call is received from a party associated with a speed dial button, the speed dial button may blink, for example, when the call is received while the telephone device is being used to engage in an ongoing call to indicate that a call from the party is effectively waiting. If the ongoing call is with another party associated with a different speed dial button, that different speed dial button may generally also be highlighted.

In general, if a caller conferences together two parties who each have an associated speed dial button on a telephone device of the caller, the speed dial buttons of the two parties may be highlighted on the telephone device. Thus, the caller may readily identify the parties who he has conferenced together using his telephone device.

The embodiments may be implemented as hardware and/or software logic embodied in a tangible medium that, when executed, is operable to perform the various methods and processes described above. That is, the logic may be embodied as physical arrangements or components. A tangible medium may be substantially any computer-readable medium that is capable of storing logic which may be executed, e.g., by a computing system, to perform methods and functions associated with the embodiments. Such computer-readable mediums may include, but are not limited to including, physical storage devices. Executable logic may include code devices, computer program code, and/or executable computer commands or instructions.

A telephone device may generally include hardware, e.g., speed dial buttons and a display screen, and software logic, e.g., logic that allows the telephone device to determine whether a particular phone number is associated with a speed dial button. It should be appreciated, however, that a telephone device may be implemented as a software telephone and, thus, may be at least primarily associated with software logic. In one embodiment, a speed dial button may be a graphical representation of a physical button that is displayed on a display screen. A telephone device may also be formed at least primarily from hardware. A call manager arrangement, like a telephone device, may be formed from hardware, software logic, or a combination of both hardware and software logic. In general, the devices and arrangements associated with the present disclosure may include hardware and/or software logic.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   obtaining information relating to a first telephone number;
   determining whether the first telephone number corresponds to a first speed dial button on a device; and
   highlighting the first speed dial button on the device when it is determined that the first telephone number corresponds to the first speed dial button, wherein when it is determined that the first telephone number does not correspond to the first speed dial button,
   determining whether the first telephone number is associated with a second telephone number,
   determining whether the second telephone number corresponds to the first speed dial button when it is determined that the first telephone number is associated with the second telephone number, and
   highlighting the first speed dial button when it is determined that the second telephone number corresponds to the first speed dial button.

2. The method of claim 1 wherein determining whether the first telephone number is associated with a second telephone number includes determining if the first telephone number and the second telephone number are both associated with a party.

3. The method of claim 1 further including:
   receiving a call that originates from the first telephone number.

4. The method of claim 1 further including:
   obtaining a voice mail message that originates from the first telephone number.

5. The method of claim 1 further including:
   initiating a call to the first telephone number before determining whether the first telephone number corresponds to the first speed dial button on the device.

6. The method of claim 1 wherein determining whether the first telephone number is associated with the second telephone number includes indexing into a data source using the first telephone number.

7. The method of claim 6 wherein determining whether the first telephone number is associated with the second telephone number includes determining when the first telephone number and the second telephone number are associated with a party.

8. A computer-readable medium comprising computer program code, the computer program code, when executed, configured to:
obtain information relating to a first telephone number;
determine whether the first telephone number corresponds to a first speed dial button on a device; and
highlight the first speed dial button on the device when it is determined that the first telephone number corresponds to the first speed dial button, wherein when it is determined that the first telephone number does not correspond to the first speed dial button, the computer program code is further configured to
determine whether the first telephone number is associated with a second telephone number,
determine whether the second telephone number corresponds to the first speed dial button when it is determined that the first telephone number is associated with the second telephone number, and
highlight the first speed dial button when it is determined that the second telephone number corresponds to the first speed dial button.

9. The computer-readable medium of claim 8 wherein the computer program code that determines whether the first telephone number is associated with a second telephone number is further configured to determine if the first telephone number and the second telephone number are both associated with a party.

10. The computer-readable medium of claim 8 further including computer program code configured to:
receive a call that originates from the first telephone number.

11. The computer-readable medium of claim 8 further including computer program code configured to:
obtain a voice mail message that originates from the first telephone number.

12. The computer-readable medium of claim 8 further including computer program code configured to:
initiate a call to the first telephone number before determining whether the first telephone number corresponds to the first speed dial button on the device.

13. The computer-readable medium of claim 8 wherein the computer program code configured to determine whether the first telephone number is associated with the second telephone number is further configured to index into a data source using the first telephone number.

14. The computer-readable medium of claim 13 wherein the computer program code configured to determine whether the first telephone number is associated with the second telephone number is further configured to determine when the first telephone number and the second telephone number are associated with a party.

15. A system comprising:
a communications arrangement, the communications arrangement being arranged to obtain information that identifies a first telephone number, the first telephone number being associated with a call;
an identification arrangement, the identification arrangement being arranged to determine if the first telephone number corresponds to a speed dial button, the identification arrangement further being arranged to determine when the first telephone number is associated with a second telephone number if the first telephone number does not correspond to the speed dial button and when the second telephone number corresponds to the speed dial button; and
a highlighting arrangement, the highlighting arrangement being arranged to highlight the speed dial button for a duration of the call if it is determined that the first telephone number corresponds to the speed dial button, the highlighting arrangement further being arranged to highlight the speed dial button for the duration of the call when it is determined that the first telephone number is associated with the second telephone number and when the second telephone number corresponds to the speed dial button.

16. The system of claim 15 wherein the identification arrangement is configured to access a data source to determine when the first telephone number is associated with the second telephone number.

17. The system of claim 16 wherein the first telephone number is associated with the second telephone number when the first telephone number and the second telephone number are both associated with a party.

18. The system of claim 15 wherein the system is a telephone device.

19. The system of claim 15 wherein the communications arrangement and the highlighting arrangement are included in a telephone device and the identification arrangement is included in a call manager arrangement, the telephone device being in communication with the call manager arrangement.

20. The system of claim 15 further comprising:
a call dialing and receiving arrangement, the call dialing and receiving arrangement being configured to dial the first telephone number to initiate the call.

21. The system of claim 15 further comprising:
a call dialing and receiving arrangement, the call dialing and receiving arrangement being configured to receive the call from the first telephone number.

* * * * *